United States Patent [19]

Sidhwa

[11] Patent Number: 4,506,263
[45] Date of Patent: Mar. 19, 1985

[54] DATA TRANSMISSION SYSTEM FOR LOGGING TOOLS

[75] Inventor: Feroze J. Sidhwa, Coppell, Tex.

[73] Assignee: Mobil Oil Corporation, New York, N.Y.

[21] Appl. No.: 265,130

[22] Filed: May 19, 1981

[51] Int. Cl.³ .......................... G01V 1/40; G01V 5/12
[52] U.S. Cl. ..................................... 340/856; 367/76; 376/119
[58] Field of Search .................. 340/856, 857, 860; 367/76, 78, 911, 35, 25, 79; 364/422; 376/118, 119; 371/53, 57; 370/117

[56] References Cited

U.S. PATENT DOCUMENTS

| | | |
|---|---|---|
| 3,309,521 | 3/1967 | Bargainer, Jr. ................. 340/856 X |
| 3,435,224 | 3/1969 | Zemanek, Jr. .................. 340/857 X |
| 3,991,611 | 11/1976 | Marshall et al. .................... 340/857 |
| 4,012,712 | 3/1977 | Nelligan ............................. 340/857 |
| 4,072,923 | 2/1978 | Siems et al. ..................... 340/857 X |

Primary Examiner—T. H. Tubbesing
Assistant Examiner—K. R. Kaiser
Attorney, Agent, or Firm—A. J. McKillop; Michael G. Gilman; Frank J. Kowalski

[57] ABSTRACT

A system for storing and transmitting pulse count information is disclosed wherein electrical pulses produced by logging tools, such as thermal neutron, are counted and stored downhole to remove the effect of lengthly transmission lines. In a further embodiment a coded multiplexed signal is transmitted uphole indicating the tool from which the transmitted data was received and the total count for a predetermined time period.

2 Claims, 5 Drawing Figures

DATA TRANSMISSION SYSTEM FOR LOGGING TOOLS

BACKGROUND OF THE INVENTION

In present day well logging techniques gamma ray, neutron and epi-thermal neutron logs are used to determine specific parameters such as porosity, shaliness, etc. These types of logs require radioactivity counting which result in an electrical pulse every count.

Often well boreholes are several miles deep. To permit transmission of electrical pulses over this great distance, the signals must be greatly amplified. Even after amplification, the distinctness of the pulses cannot be maintained precisely and several closely spaced pulses may merge. This merging may result in inaccurate radioactivity counts which may lead to wrong conclusions with respect to porosity or shaliness etc. A solution to pulse merging is to count pulses downhole and transmit the pulse count uphole. This system has its advantages in the number of wires needed when several pulse counting types of logging tools (such as thermal neutron, epi thermal neutron and gamma ray) are being used simultaneously.

SUMMARY OF THE INVENTION

The present invention pertains to well logging systems and in particular to well logging devices that produce a plurality of electrical pulses whose total number in a predetermined time frame is of importance. Detected pulses are counted and placed in storage until the information is transmitted uphole. Counting the electrical pulses downhole prevents resulting inaccurate totals from transmission losses.

A further embodiment of the present invention includes a method and apparatus for removing the counted pulses from storage and coding this information for transmission uphole in a time multiplex system. A status byte is transmitted uphole followed by a series of information bytes which may be grouped for larger quantities of data from a specific logging tool.

DESCRIPTION OF THE PREFERRED EMBODIMENTS

Figure 1:
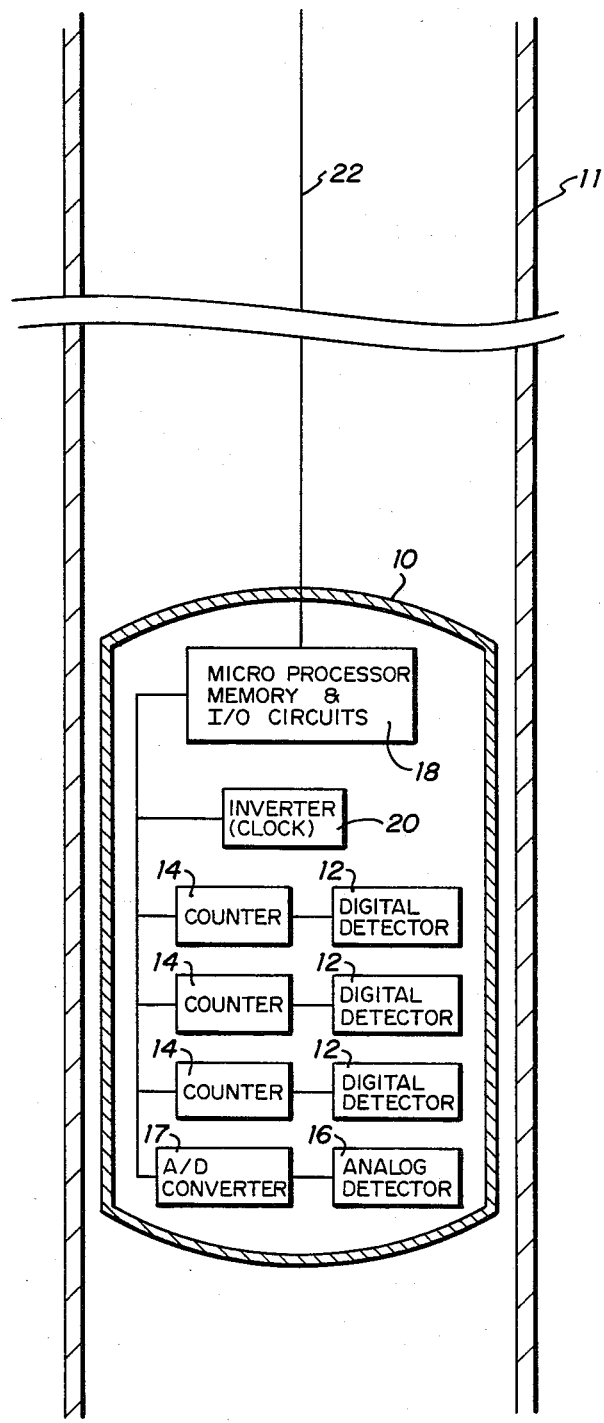
FIG. 1 is a block diagram of a logging tool.
Figure 2:
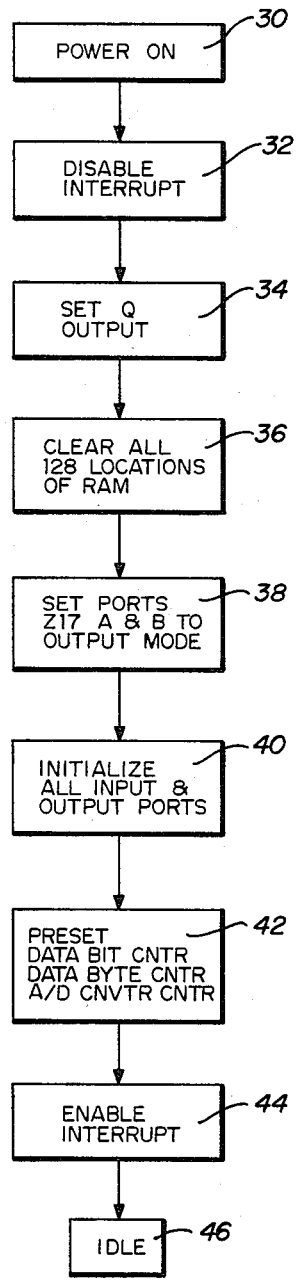
FIGS. 2 through 5 are flow diagrams of a method for processing data.
Figure 3:
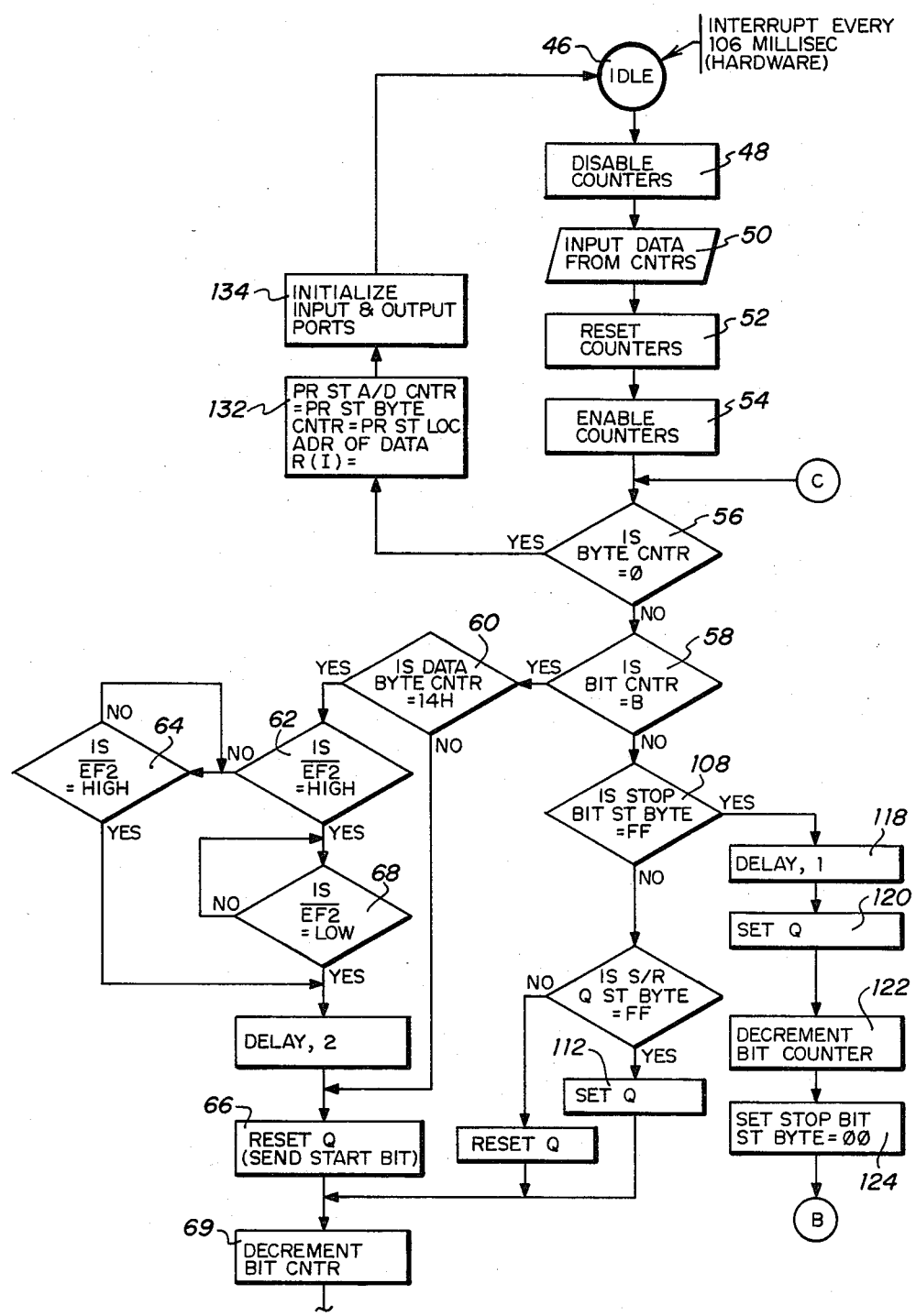
Figure 4:
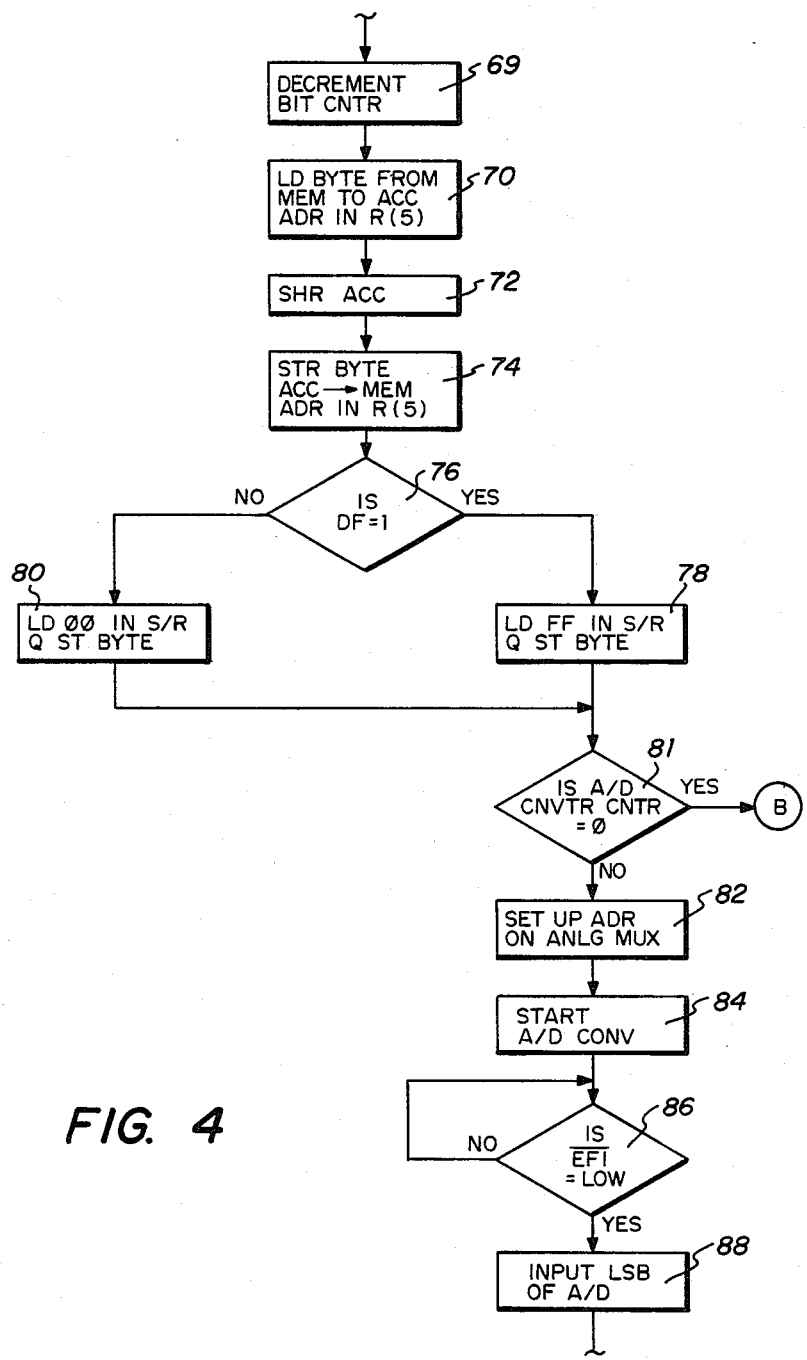
Figure 5:
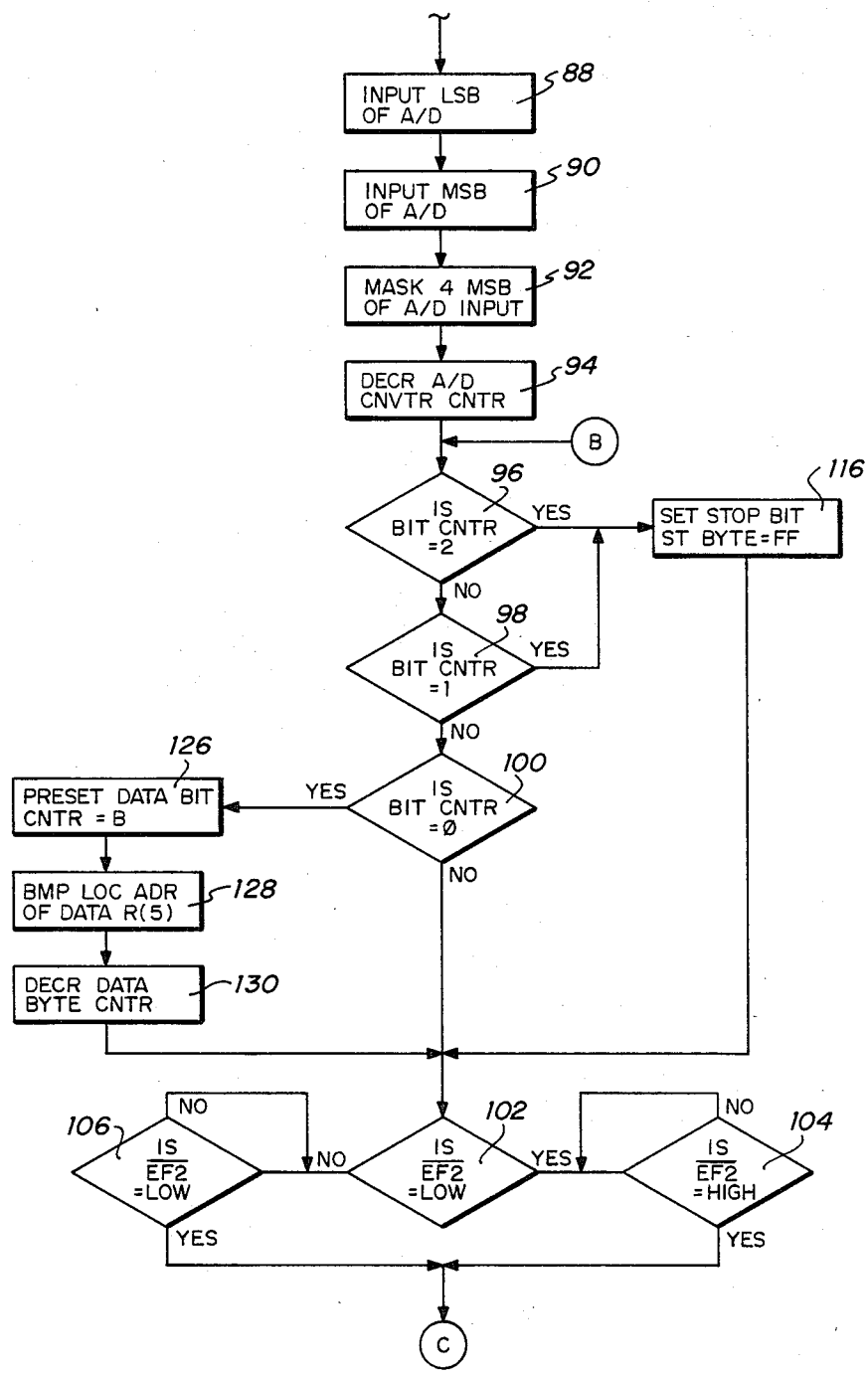

FIG. 1 illustrates a logging tool 10 located in a borehole 11 having a plurality of detectors 12 each connected to counters 14 and an analog detector 16 connected to analog to digital converter 17. Counters 14 provide inputs to microprocessor 18 through interrupter 20. Microprocessor 18 sends the counts from counters 14 and analog to digital converter 17 uphole through transmission wire 22.

Pulses such as gamma rays, thermal neutrons epithermal neutrons etc. are detected by detectors 12. These pulses are transmitted to counters 14, which may be of any type counters known in the art. Interrupter 20 stops counters 14 at predetermined intervals to permit data to be gathered by microprocessor 18. In the preferred embodiment, a predetermined interval of 106 m s is used to permit transmission of twenty bytes of information uphole. Analog to digital converter 17 may also be used to supply information to microprocessor 18.

FIGS. 2 through 5 illustrate a flow diagram of the start up method of the present invention beginning with power energization block 30. When power is initialized at power on block 30 several "housekeeping chores" are performed prior to obtaining and transmitting data. Interrupter 20 is disabled at block 32 and Q output are set at block 34. All available memory locations of the random access memory of microprocessor 18 are cleared at block 36. Port Z17 (not shown) microprocessor 18 is set to the output mode at block 38. At block 40 the input and output ports are initialized. At block 42 the data bit counter and data byte counters are preset with a predetermined number depending upon the amount of information which is going to be transmitted uphole. In the preferred embodiment the bit counter is set at 11 and the data byte counter is set at hexidecimal 20. Also at block 42 the analog to digital converter counter is set for the number of analog to digital conversions which are going to be performed. When these "housekeeping chores" have been performed interrupter 20 is again enabled at block 44. The entire data collection and transmission system is then set to idle at block 46. Microprocessor 18 idles or waits for an interrupt signal for interrupter 20 which, as was pointed out previously, occurs every 106 milliseconds.

When an interrupt signal is received counters 14 are disabled at block 48 and input data from the counters is received at block 50. After data is obtained from counters 14 they are reset to 0 at block 52. The counters are then enabled at block 54. At block 56 the first in a series of questions is asked, namely, is byte counter equal to 0. Byte counter has been set equal to a 20 which is equal to 14 hex. The answer will be no and an additional question will be asked at block 58, namely is bit counter equal to 11 which is equal to B in hexidecimal. The counter has been set equal to B for the first time through the routine so the answer will be yes. Function of block 62, 64 and 68 is to detect transition on the EF2 flag. This transition could be a low to high transition or a high to low transition. The important thing is to detect a transition and not a level.

For example, say EF2 is high so at block 62 the answer will be yes, again block 68 asks the question if EF2 is low, so answer of block 68 will be no, so the output of block 68 is rerouted to the input of block 68 and block 68 keeps asking the same question again and again "is EF2=low". So it is in a loop, the only way it can get out of the loop is when EF2 goes low, so this is the point where a high to low transition is detected.

Another example say EF2 is low so at block 62 the answer will be no, again in block 64 the question asked is "is EF2=high" and of course the answer will be no, so this time we are in a loop around block 64, the only way to get out of the loop would be to get yes answer from block 64. This would only happen when EF2 goes high. So this is the point where a low to high transition is detected.

At block 66 Q is reset and a start bit, which is a low, is sent. When the start bit is sent at block 66 the program moves to block 68 which decrements the bit counter.

The sub-routine comprising blocks 60, 62, 64, 66, and 68 is performed to send the start bit of first byte of each transmission. In the preferred embodiment 20 bytes of information will be performed for each complete transmission, each byte having 11 bits of information. The first bit will be a start bit followed by 8 bits of data which is followed by 2 stop bits.

After the sub routines send the start bit for each data byte the first byte of data which is received from counters 14 at block 50 is loaded from the memory into the accumulator address at block 70. At block 72 all of the data in the byte which has been loaded from the memory is shifted to the right. The right most bit contained in the first byte or the byte being shipped will drop into another location which is called DF or Data Flag. At block 74 the byte of information which has been moved from the memory to the accumulator is moved from the accumulator back to the memory less the right most bit. The right most bit of information in the byte being transmitted is then tested and transmitted. This is repeated as the program repeats until all bits of information for a single byte have been tested and transmitted. After the byte of information has been restored into memory a decision block 76 is performed where the right most bit of information is tested, namely is data flag=1. If the answer to decision block 76 is yes, all ones are loaded in the set/reset Q status byte at block 78 whereas if the answer is no all 0's are loaded in set/reset Q status byte at block 80. The outputs of both blocks 78 and 80 provide the input for the next phase of the program comprises a sub routine for analog to digital conversions. At block 81 a decision block is encountered where a question to determine whether any analog to digital conversions are to be performed and whether they have all been performed. The questions is asked is analog to digital converter counter=0. Analog to digital converter counter has been set at block 42 for the number of analog to digital conversions which are to be performed. If no analog to digital conversions are to be performed the counter will be set to 0, however, this capability has been added to the preferred embodiment so that a predetermined number, such as 7, analog to digital conversions may be performed.

Assuming that several analog to digital conversions are to be performed the counter will not be equal to 0 since none of the analog to digital conversions have been performed yet. At block 82 an address is set up on the analog multiplexer to route the proper analog data which must be converted. At block 84 the analog to digital converter is initiated. Microprocessor 16 has an input flag which is labeled EF1 which is low when an analog to digital conversion has been completed. At decision block 86 microprocessor 16 watches this flag to determine whether EF1 is equal to low. If EF1 does not equal to low or is equal to a high the answer is no and a delay function is performed where the output of block 86 is recirculated to its input until EF1 becomes low. When EF1 becomes a low the analog to digital converter will be signalling the microprocessor that the analog to digital conversion has been completed. The preferred embodiment memory can handle 8 bits of information whereas in most cases the analog to digital conversion data will occupy as much as 12 bits. Thus at block 88 the least significant byte or 8 bits of information is input from the analog to digital converter and at block 90 the most significant byte or 8 bits of data is input into the microprocessor. Since the analog to digital converter has 12 bits of information and a total of 16 bits or 2 bytes of information is input, the four most significant bits of the most significant byte will be worthless information. These 4 most significant bits are masked at block 92. When the storing of the information from the first analog to digital conversion is complete, the analog to digital converter counter is decremented at block 94.

The analog to digital conversion comprising blocks 81, 82, 84, 86, 88, 90, 92, and 94 will perform during the transmission of the start bit of information. At this point a decision block 96 is encountered which asks the question "is the bit counter equal to 2". Since the bit counter was set at $B_H$ or decimal 11 and the first bit of information the start bit has been sent. Incrementing the bit counter by one, the answer will be no. Decision block 98 then asks the question "is bit counter=1" and of course the answer again will be no. An additional decision block 100 asks if the bit counter is equal to 0 and again the answer is no. The output of decision block 100 then becomes the input of decision block 102 which asks the question is EF2=low. EF2 is an input port which is used as a flag to indicate that the transmission of a bit of data has been complete. EF2 is connected to a clock (not shown) which indicates that the transmission of a bit of data has been completed by a transition from one state to the other of EF2. The first question at decision block 102 indicates the status of EF2 if it is low the output of decision block 102 goes to decision block 104 which asks is EF2=high. If the answer is no which it will be since the answer to the question is EF2=low is yes. The output of 104 will become its input and create a delay until there is a transition and EF2 becomes a high. Similarly, if the answer to decision block 102 is no the output of decision block 102 provides the input for decision block 106 which asks the same question is EF2=low. If the answer for decision block 102 was no the answer for decision block 106 will also be no and the output of decision block 106 is circulated to its input until a transition occurs to change EF2 to a high. When a transition occurs the outputs of decision blocks 104 and 106 are transferred to the input of block 56 which begins the process for the transmission of the next bit of information.

At block 56 the question "is byte counter=0" is again asked and for the first byte of information byte counter will still be equal to 14 hex and the answer will be no. The next decision block, block 58, is again encountered and the question "is bit counter=B" is asked. At this point one bit of information, the start bit, has been transmitted and the bit counter has been decremented to $A_H$. Therefore the answer to this question will be no and decision block 108 is encountered which asks the question "is the stop bit status byte=ff". Since we are sending the first bit of data which is the second bit of information the stop bit status byte will not be equal to ff or all ones and the answer will be no. From decision block 108, decision block 110 is encountered when the answer is no. Decision block 110 asks the question "is the set/reset Q status byte=ff or all ones". If the answer in decision block 110 is yes, Q is set at block 112. If the answer for decision block 110 is no, Q is reset at block 114. The output of both blocks 112 and 114 become the input to block 69 which decrements the bit counter. From block 69 we proceed again to load a byte of information, which in this case will be the first byte, from memory into the accumulator address at block 70. At block 72 the byte of information is again shifted to the right and at block 74 the byte of information is reloaded from the accumulator to memory. At block 76 the data flag which is the current right most bit of information remaining in the byte after the first shift to the right is tested to determine whether it is high or low. As previously pointed out if the data flag is 1 or 0 either all ones or all zeros will be loaded into the set/reset Q status byte at blocks 78 and 80 respectively. The outputs of blocks 78 and 80 both go to the decision block 81 where the question "is analog to digital converter counter=0" is asked.

For the purposes of example, let us assume that all analog to digital conversions have been completed or that no analog to digital conversions are to be performed and the counter is equal to 0. The output of decision block 80 will then go to the input of decision block 96. Also for the purposes of example let us assume that one start bit and 8 data bits have been transmitted and the bit counter has been decremented by, one start bit and eight data bits so that the bit counter is now equal to 2. At decision block 96 if bit counter is equal to 2 the output goes to the input of block 116 where the stop bit status byte is set to ff or all ones. The output of block 116 goes to the input of decision block 102 where a sub routine to delay the program until the transmission of a bit of information is complete and decision blocks 104 and 106 have indicated a transition to microprocessor 16. The outputs of blocks 104 and 106 become the input to block 56 where the question is "byte counter=0" is again asked. Since we are completing the transmission of the first byte of information the answer will again be no. Decision block 58 is then encountered and the question "is bit counter=B" asked. At this point bit counter is equal to 2 so the answer to decision block 58 is no and we will proceed to decision block 108 which asks the question "is stop bit status byte=ff". At block 116 we had set the stop bit status byte equal to ff so that the answer will be yes. The output of decision block 108 then proceeds to block 118 which is merely a delay to permit transmission of the first stop bit at precise time. The output of block 118 is the input for block 120 where Q is set. From block 120 we will proceed to block 122 where the bit counter is decremented by 1. From block 122 we proceed to block 124 which sets the stop bit status byte equal to 00. From block 124 we proceed to decision block 96 which asks "is bit counter=2". The answer will be no since bit counter has been decremented by one and is now equal to 1. Output from decision block 96 is input into decision block 98 which asks the question "is bit counter=1". A yes answer at decision block 98 puts an input into block 116 which sets the stop bit status byte equal to ff and proceeds through blocks 102 and either 104 or 106 back to block 56. Since transmission of the stop bits for the first byte of information is being performed, the answer to decision block 56 will be no, taking us to block 58 which also has a no answer. A no answer at block 58 proceeds to block 108 which asks "is stop bit status byte=ff. At block 116, stop bit status byte was set equal to ff so the answer will be yes. The program proceeds thru delay block 118, to block 120 where Q is set, to block 122 where the bit counter is decremented and to block 124 where the stop bit status byte is set equal to 00. From block 124 the program flowed to decision block 96 which asks "is bit counter=2. Again the answer is no and we proceed to decision block 98 which asks "is bit counter=1. Since we have decremented the bit counter at block 122 it is now equal to 0, a no output from decision block 98 provides the input to decision block 100 which asks the question "is bit counter=0. This time the answer to decision block 100 will be yes which will provide the input for block 126 where we preset the data bit counter back=$B_H$. The output of block 126 is the input for 128 where the location address of data is bumped by one. The output of block 128 provides the input for block 130 where we decrement the data byte counter by one and proceed to decision block 102 where, as previously described a delay is created until the most recent bit of data is complete. After transition by EF2 the program proceeds to decision block 56.

For the purpose of example let us assume that all data bytes have been transmitted and byte counter has been decremented at block 130 to the point it is equal to 0. At the point the answer in decision block 56 is yes which provides and input to block 132 where the analog to digital converter counter, the byte counter and the bit counter are reset to a predetermined numbers which, for the preferred embodiment, has previously been discussed. The output of block 132 provides the input for block 134 where the input and output ports are again initialized. From block 134 the program proceeds to block 46 where it idles until an interrupt signal is received from interrupter 18.

The transmission of 20 bytes of data each 11 bits long will take approximately 94 milliseconds in the preferred embodiment and an interrupt signal is received every 106 milliseconds. Thus, the microprocessor will remain in its idle state for approximately 10 to 12 milliseconds.

The method and apparatus of the present invention provides a fast and accurate means for transmitting data from logging tools such as a gamma ray, thermal neutron, epi thermal neutron, etc. type of logging tool. Digital data or analog data converted to digital data is stored in a memory having a plurality of byte capability each consisting of several bits of information. Thru the use of microprocessor this data is serially transmitted uphole while additional data is being collected. Predetermined number of operations are set into the microprocessor and are repeated until completion of the series of operations is indicated by the operator.

While the present invention has been described by way of preferred embodiment its scope should not be limited thereto but only by the scope of the following claims.

What is claimed is:

1. In a well logging system having a plurality of detectors which supply data to counters, a power source, a memory with data bytes consisting of a plurality of data bits and a plurality of input/output ports, a method of collecting and transmitting data comprising:

loading said data from said counters into said memory;

determining the serial position of data transmission with respect to the number of bytes transmitted and the number of bits transmitted;

transmitting a start bit whenever said transmission position is the first bit of a byte of information;

transmitting a plurality of bits of information for each byte of said data;

decrementing a bit counter after transmission of each bit of information;

transmitting stop bits at the end of each byte of data;

decrementing a byte counter after each transmission of a byte of data;

detecting completion of serial transmission by the absence of data; and repeating said transmission of said data bytes and transmission of said data bits at predetermined intervals.

2. The method according to claim 1 also including the steps of:

providing analog data to at least one of said input-/output ports;

performing an analog to digital conversion of said analog data;

indicating when said analog to digital conversion is complete;

inputting a least significant byte of said analog to digital conversion into said memory;

inputting a most significant byte of said analog to digital conversion into said memory; and masking a plurality of most significant bytes which contain no information.

* * * * *

UNITED STATES PATENT AND TRADEMARK OFFICE
CERTIFICATE OF CORRECTION

PATENT NO. : 4,506,263
DATED : March 19, 1985
INVENTOR(S) : Feroze J. Sidhwa

It is certified that error appears in the above-identified patent and that said Letters Patent is hereby corrected as shown below:

Col. 2, lines 38, 42, 43, 47, 48, 50, 52 and 55, in each occurrence, "EF2" should be --$\overline{EF2}$--.

Col. 3, lines 44, 47, 50 and 51, in each occurrence, "EF1" should be --$\overline{EF1}$--.

Col. 4, lines 14, 16, 19, 20, 22, 23, 25, 29 and 32, in each occurrence, "EF2" should be --$\overline{EF2}$--.

Col. 6, line 4, "EF2" should be --$\overline{EF2}$--.

Signed and Sealed this

Ninth Day of July 1985

[SEAL]

Attest:

DONALD J. QUIGG

Attesting Officer

Acting Commissioner of Patents and Trademarks